April 9, 1940.   K. A. BROWNE ET AL   2,196,247
SUPERCHARGER RELIEF VALVE
Filed Oct. 18, 1938

INVENTOR
KENNETH A. BROWNE AND
FRANK B. HUNTER
BY
ATTORNEY

Patented Apr. 9, 1940

2,196,247

UNITED STATES PATENT OFFICE 2,196,247

SUPERCHARGER RELIEF VALVE

Kenneth A. Browne, Westwood, and Frank B. Hunter, Wyckoff, N. J., assignors to Wright Aeronautical Corporation, a corporation of New York Application October 18, 1938, Serial No. 235,575

6 Claims. (Cl. 60—13)

This invention relates to internal combustion power plants, and provides means for increasing the safety of operation thereof and for improving performance under certain conditions of operation.

In aircraft engine installations in which an exhaust driven turbo-supercharger is used to increase the pressure of intake air fed to the engine carburetor, the supercharger is subject to damage when the engine backfires through the carburetor due to the excessive pressure rise thereat. Accordingly, an object of the invention is to provide a safety valve in the delivery duct from the supercharger to the engine carburetor which is adapted to relieve excess pressure caused by engine backfire and which further, is operative in response to a finite pressure rise in the supercharger delivery regardless of the altitude at which the engine may be operating.

In a turbo-supercharged engine, the operation of the turbo-supercharger is normally controlled by a waste gate whereby engine exhaust may be directed either to the turbine or may be exhausted to the atmosphere before it reaches the turbine. A valve in the atmospheric exhaust, commonly known as a waste gate, may be opened to any desired degree to provide a desired amount of supercharge. If the waste gate be fully opened, the turbo-supercharger does not operate and normally, the air feed for the engine is taken through the supercharger to the aircraft carburetor. It will be seen that an undue pressure drop may occur in this condition, since the engine must draw its air through the static supercharger and diffuser and consequently the pressure at the carburetor intake may be somewhat less than atmospheric. Accordingly, it is an object of the invention to provide a valve arrangement operable in response to subatmospheric pressure in the supercharger delivery by which the delivery is opened directly to the atmosphere. Furthermore, the two functions indicated above may be accomplished by a single instrumentality and accordingly it is another object of the invention to provide a single valve organization operable as a safety valve and also operable as a by-pass to avoid pressure drop in the carburetor intake duct.

Figure 1:
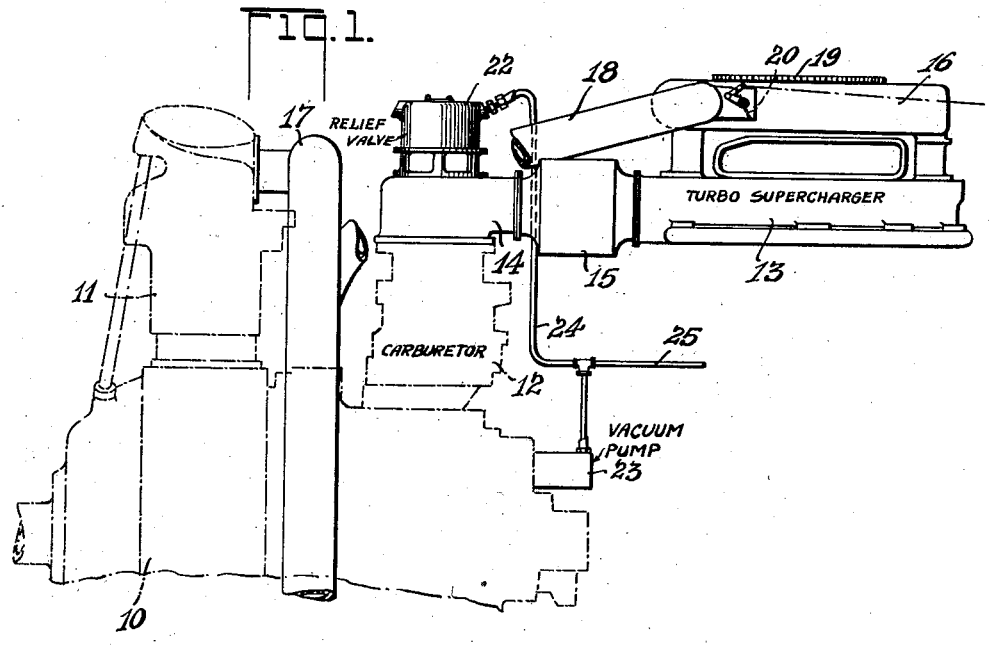
Figure 2:
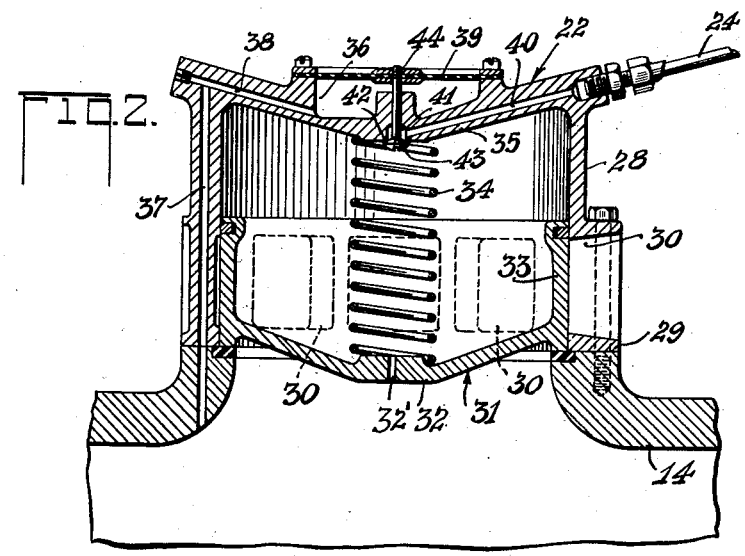

Further objects will be apparent from a reading of the annexed specification and claims, together with an examination of the accompanying drawing, in which:

Fig. 1 is a side elevation of an aircraft power plant comprising an engine and a turbo-supercharger, incorporating the provisions of the invention; and Fig. 2 is a section through a valve device according to the invention.

Referring to Fig. 1, 10 designates an engine crankcase on which radially disposed cylinders are mounted, one of which is indicated at 11. The rear portion of the crankcase carries a carburetor 12 connected to a supercharger 13 by a duct 14 which may, if desired, be placed in series with an intercooler 15. The supercharger is driven by a turbine 16 connected to the exhaust manifold 17 of the engine by a duct 18, the latter being provided with an atmospheric outlet 19 in which is disposed a controllable waste gate 20. As is well known in the art, the waste gate when closed causes exhaust gas to pass to the turbine whereby the supercharger is rotated at high speed, causing a greater than atmospheric pressure in the carburetor intake and in the duct 14. If the waste gate 20 be opened, the exhaust gas passes directly to the atmosphere whereupon the turbine 16 may cease operation. If during engine operation, either with or without turbo-supercharger operation, the engine should backfire, a pressure surge builds up in the carburetor and duct 14 which cannot be relieved until it passes through the various passages of the supercharger. A device 22, shortly to be described in detail, comprises a safety valve operable to release such pressure surges directly to the atmosphere.

During power plant operation, particularly at low altitude, the waste gate 20 may be opened, whereupon the supercharger does not boost the air charge and during which time intake air for the carburetor 12 must be drawn through the supercharger air intake, past the impeller and through the diffuser passages, all of which offer an obstruction to free air flow causing an undesirable sub-atmospheric pressure at the carburetor intake. The device 22 is organized to open under such conditions to permit of direct air intake through to the carburetor without passing through the supercharger.

It will be noted that in Fig. 1, a vacuum pump 23 is secured to and is driven by the engine, and this vacuum pump is connected by a pipe 24 to the device 22. The vacuum pump is also utilized for the operation of various aircraft instruments, as is well known, a pipe 25 leading from the vacuum pump for this purpose. Vacuum may alternately be supplied by an air flow venturi. Referring to Fig. 2, the device 22 consists of a cylindrical element 28 having a flange 29 for attachment to the conduit 14 and having a plurality of peripheral openings 30 in its lowermost part in free communication with the atmosphere. Within the cylinder 28 is a piston valve 31 having a head 32 open to the conduit 14, and a skirt 33 arranged to cover the openings 30 when the piston is in its lowermost position. The piston is raisable within the cylinder 28 so that free communication is established from the atmosphere to the interior of the conduit 14 through the openings 30. The piston 31 is normally urged to a downward position by a spring 34 disposed between the piston head 32 and the cylinder head indicated at 35, this spring being relatively light. The piston head 32 is vented as at 32' so pressure in the cylinder 28 above the piston will be equivalent under uniform operating conditions to the pressure existing in the conduit 14, whereby the light spring 34 holds the valve closed. If a sudden surge of high pressure should exist within the conduit 14, as would be caused by an engine backfire, the vent 32' is too small to permit of an immediate pressure balance, and accordingly, the piston 31 will be raised, uncovering the openings 30 and permitting immediate relief of the pressure surge. In the above described functioning of the instrument, it serves as an intake safety valve.

The cylinder head 35 is provided with a chamber 36, above the cylinder 28, in communication with the conduit 14 through drillings 37 and 38, the chamber having across its top a resilient diaphragm 39 which accordingly is subject to atmospheric pressure on its outer surface and pressure in the conduit 14 on its inner surface. A drilling 40 in the head 35 communicates with the suction line 24 and with a zone 41 adjacent a valve seat 42 upon which seats a small valve 43, the stem of the latter being attached to the diaphragm 39 as at 44. When the supercharger 13 is operating, the pressure in the conduit 14 will be greater than that of the surrounding atmosphere, this pressure being communicated to the chamber 36, whereat it acts upon the diaphragm 39 to hold the valve at 43 closed. When the turbo-supercharger is not operating, the pressure in the conduit 14 tends to become less than atmospheric due to the obstructions offered by the static supercharger, and this low pressure is then communicated to the chamber 36 wherefor the diaphragm 39 is depressed due to the external atmospheric pressure, opening the valve 43, and connecting the vacuum pump 23 with the interior of the cylinder 28. Since the vacuum afforded by the pump reduces the pressure within the cylinder 28 to a point below the pressure existing in the conduit 14, the piston 31 will be drawn upwardly against the light spring 34 and atmospheric air enters through the openings 30 direct to the carburetor, by-passing the supercharger 13. At such time as the pressure in the conduit 14 becomes greater than atmospheric, as when the supercharger is operated, the valve 43 will close, cutting off the vacuum pump, whereupon the piston 31 will close off the openings 30 to permit of normal supercharger operation.

In effect, the device 22 becomes a two-way valve, operating as a safety valve to relieve excessive pressure from the intake system and operating also as a by-pass valve to permit of direct air intake to the carburetor when the pressure thereat becomes less than atmospheric. Due to the venting of the chamber 28 through the piston vent 32', the device is fully responsive to either of its functions under all conditions of altitude.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In a power plant including an engine and a turbo-supercharger the turbine thereof being variably driven by the engine exhaust through a waste gate control and the supercharger feeding air to said engine through a conduit, a vented valve in the supercharger delivery conduit openable to bleed air to the engine without passing through the supercharger, means responsive to less-than-atmospheric pressure in said delivery conduit for opening said valve, and resilient means, normally holding said valve closed, deformable upon sudden pressure rise in said delivery conduit to allow valve opening and relief of excess pressure.

2. In a power plant comprising a supercharger connected to an engine, a low pressure source independent of the manifold, a valve unit at said connection comprising a vented piston valve, a cylinder within which said piston is slidable, said cylinder having openings near its bottom openable by piston raising to communicate with said connection, a small valve adjustable to open and close communication between said low pressure source and the interior upper part of said cylinder above said piston, and means for opening said small valve responsive to less-than-atmospheric pressure in said connection.

3. In a power plant comprising a supercharger connected to an engine, a low pressure source independent of the manifold, a valve unit at said connection comprising a vented piston valve, a cylinder within which said piston is slidable, said cylinder having openings near its bottom openable by piston raising to communicate with said connection, a small valve adjustable to open and close communication between said low pressure source and the interior upper part of said cylinder above said piston, and means for operating said small valve comprising a diaphragm connected thereto and subject on one side to atmospheric pressure and on the other side to engine intake pressure.

4. In a power plant comprising a supercharger connected to an engine, a low pressure source independent of the manifold, a valve unit at said connection comprising a vented piston valve, a cylinder within which said piston is slidable, said cylinder having openings near its bottom openable by piston raising to communicate with said connection, a small valve adjustable to open and close communication between said low pressure source and the interior upper part of said cylinder above said piston, means for operating said small valve comprising a diaphragm connected thereto and subject on one side to atmospheric pressure and on the other side to engine intake pressure, and resilient means normally holding said piston valve in a position to close said openings, said piston being raisable against said resilient means due to sudden pressure rise in the engine intake, to open the connection to the atmosphere.

5. A valve device for the supercharger delivery conduit of an internal combustion power plant comprising a housing having a central wall defining chambers on opposite sides thereof, the first said chamber being open to the supercharger delivery conduit and having a port open to the atmosphere, a valve movable in the first chamber to open and close said port relative to the supercharger delivery conduit, said valve being operated by pressure differential between the supercharger delivery conduit and the first chamber, the second chamber communicating with the supercharger delivery conduit and having a flexible closure closing same, the closure being acted upon externally by atmospheric pressure, a source of low pressure independent of the conduit, and a valve operated by movement of said closure for opening said first chamber to said low pressure source.

6. An air valve for the intake system of a supercharged engine comprising a closed top cylindrical casing having ports in its lower part, a piston slidable in the cylinder having a skirt covering said ports when the piston is in a low position, said piston having a restricted vent hole therein, resilient means acting between the casing top and piston normally urging said piston to a port-covering position, a vacuum conduit, a small valve openable to connect said conduit to the cylinder interior, and a diaphragm, operatively connected to said small valve, subject on one side to atmospheric pressure and on its other side to manifold pressure.

FRANK B. HUNTER.
KENNETH A. BROWNE.